United States Patent [19]

Fock et al.

[11] Patent Number: 5,721,321
[45] Date of Patent: Feb. 24, 1998

[54] POLYMETHACRYLIC ESTERS WHOSE ESTER GROUPS IN POSITION AND DIFFER FROM THOSE IN THE CHAIN

[75] Inventors: Jürgen Fock, Dusseldorf; Arno Knebelkamp, Essen, both of Germany

[73] Assignee: Th. Goldschmidt AG, Essen, Germany

[21] Appl. No.: 714,238

[22] Filed: Sep. 16, 1996

[30] Foreign Application Priority Data

Sep. 21, 1995 [DE] Germany ............. 195 35 077.4

[51] Int. Cl.⁶ ................................................. C08F 8/34
[52] U.S. Cl. .................. 525/330.6; 525/343; 525/384
[58] Field of Search ........................... 525/330.6, 343, 525/384

[56] References Cited

U.S. PATENT DOCUMENTS

| | | |
|---|---|---|
| 5,057,580 | 10/1991 | Fock et al. . |
| 5,115,039 | 5/1992 | Fock et al. . |
| 5,133,898 | 7/1992 | Fock et al. ............. 525/330.6 |
| 5,338,445 | 8/1994 | Fock et al. ............. 525/330.6 |

FOREIGN PATENT DOCUMENTS 43 06 537 A1  9/1994  Germany .

OTHER PUBLICATIONS

Chernenkova, Yu. P.;"Study of the interection of poly(m-ethyl methacrylate) with diethylaminoethanol" 1982, No.98:54652f, vol. 98 p. 2, lines 10–19.

*Primary Examiner*—Bernard Lipman
*Attorney, Agent, or Firm*—Scully, Scott, Murphy & Presser

[57] ABSTRACT

Disclosed are polymethacrylic esters of the central formula

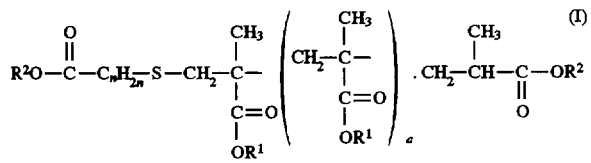

in which the radicals $R^1$ are identical or different and are alkyl radicals having 1 to 8 carbon atoms, perfluoroalkyl radicals or dialkylaminoalkyl radicals, and $R_2$ radicals are derived from an alcohol $R^2OH$, n is a number from 1 to 6, and a is a number which on average is $\leq 4$, and a process of making the esters by transesterification.

12 Claims, No Drawings

POLYMETHACRYLIC ESTERS WHOSE ESTER GROUPS IN POSITION AND DIFFER FROM THOSE IN THE CHAIN

FIELD OF THE INVENTION

The invention relates to novel polymethacrylic esters whose ester groups in positions α and ω differ from those which are present in the chain. The invention also relates to a process for the preparation of these compounds by transesterification.

BACKGROUND OF THE INVENTION

Functionalized polyacrylic esters obtained by transesterification of alkyl polyacrylates (alkyl radicals with 1 to 4 carbon atoms) with specific alcohols, which usually contain functional groups, have recently been described in a number of references, for example in DE-C 38 42 201. These transesterification products have substantial advantages over the analogous copolymers, for example a substantially more uniform molecular weight distribution. They are largely free from monomeric fractions. Only by the transesterification process is it possible at all to prepare polyacrylic esters whose alcoholic ester component contains olefinic double bonds, without the formation of high molecular mass by-products. For instance, it is readily possible to transesterify polyacrylic esters with oleyl alcohol and, at the same time, with other hydroxyl-containing compounds.

In the majority of these transesterification processes, the degree of transesterification reached is about 70%, a level at which it is possible to obtain products with at least approximately random distribution along the polymer chain of the alcohols introduced by the transesterification.

These transesterification processes cannot readily be carried out with the corresponding alkyl polymethacrylates.

Admittedly, Chemical Abstracts 98 (No. 8,54652f) discloses the reaction of polymethacrylic esters with a large excess of diethylaminoethanol at temperatures of >150° C. in the presence of titanates as catalysts. In the polymers obtained in this process, some of the ester groups have been transesterified with diethylaminoethanol. At this temperature, however, relatively nonuniform products are obtained, and it is not possible to avoid thermal decomposition products.

In contrast, in accordance with DE-A 43 06 537 and given the observation of certain structural parameters for the polymethacrylic esters to be reacted, and an appropriate choice of the process conditions during the transesterification, it is possible to transesterify one or both terminal ester groups. This makes it possible to prepare polymethacrylic esters whose ester groups in positions α and ω differ from those in the chain.

In this process, the polymethacrylic esters obtained are of the general formula

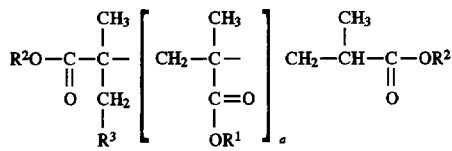

in which the radicals $R^1$ are identical or different and are alkyl radicals having 1 to 8 carbon atoms, perfluoroalkyl radicals or dialkylaminoalkyl radicals, and $R^2$ have the meaning of the radicals $R^1$ or are radicals derived from an alcohol $R^2OH$, $R^3$ is the radical of a mercaptan chain regulator which is known per se, the radical $R^3$ being free from active hydrogen atoms, and a is a number which on average is $\geq 4$, with the proviso that the alcohol $R^2OH$ has a higher boiling point than the alcohol $R^1OH$ and that in the average molecule at least 1 radical $R^2$ is other than $R^1$.

In the preparation of these compounds, the terminal ester group in position ω, which is on the single tertiary carbon atom of the chain, can be transesterified with high selectivity and virtually quantitative yield, owing to its particularly high reactivity, under defined conditions (relatively low temperature, one mole equivalent of an OH-functonal component, catalyst based on titanates, zirconates or stannates).

The terminal ester group in position α, which is directly adjacent to the radical $R^3$ originating from the chain regulator and is therefore on a quaternary carbon atom, can be transesterified only with difficulty. In general, considerably higher temperatures (160° to 170° C.) are required than for the single transesterification of the ester group in position ω; under the stated conditions, all of the ester groups which are in the chain do not react at all.

Moreover, in the presence of typical transesterification catalysts, for example titanium compounds and zirconium compounds, these high temperatures often lead to unwanted instances of discoloration of the product. Moreover, it is not possible to employ thermally unstable OH-functional compounds under these drastic conditions.

The starting compounds employed according to DE-A 43 06 537 are polymethacrylates as are obtained by free-radical polymerization of methacrylates in the presence of mercaptans as chain transfer reagents.

BRIEF SUMMARY OF THE INVENTION

If the free-radical polymerization of methacrylates is carried out, in contrast, in the presence of ester-functional or carboxyl-functional mercaptans of the type R*(H)OC(O)—(CH$_2$)$_n$—SH, polymethacrylates of the formula

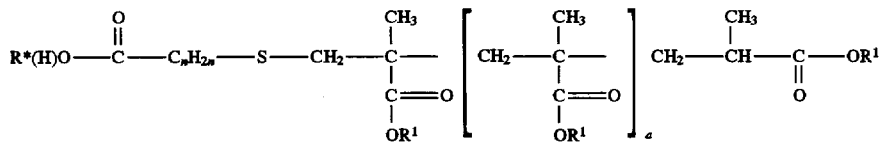

are obtained whose ester or acid group in position α differs from the abovementioned ester group in position α in that it has been introduced by the regulator and is linked to a secondary or, possibly, tertiary carbon atom ($C_nH_{2n}$).

It has now been found that, in the case of such polymethacrylates, both terminal ester groups, in positions α and ω can be transesterified quantitatively under relatively mild conditions to give the novel polymethacrylic esters of the formula (I).

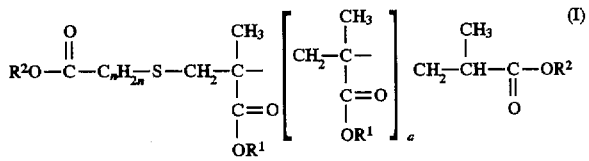

The invention additionally relates to a process for the preparation of the novel polymethacrylic esters, according to the invention, of the formula (I). The novel process is characterized in that a polymethacrylic ester of the general formula (II)

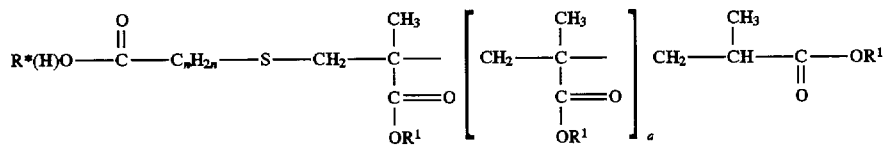

which can be obtained by free-radical polymerization in the presence of ester-functional or carboxyl-functional mercaptans, is transesterified with alcohol of the formula $R^2OH$ at a temperature from 100° to 130° C., in the presence or absence of solvents, in the presence of a nonbasic transesterification catalyst which is known per se, in a molar ratio of polymethacrylic ester: $R^2OH$ of from 1:1 to 1:5, preferably 1:1 to 1:2.

In formulas (I) and (II), the radicals $R^1$ are identical or different and each is an alkyl or perfluoroalkyl radical having 1 to 8 carbon atoms, or a dialkylaminoalkyl radical wherein each alkyl group has 1 to 8 carbon atoms;

$R^*$ is derived from a chain regulator, known per se, of the type $R^*OC(O)$—$(CH_2)_n$—SH, in which $R^*$ denotes an alkyl or alkaryl radical having 1 to 16 carbon atoms, $R^2$ radicals are derived from an alcohol $R^2OH$, n is a number from 1 to 6, and a is a number which on average is greater than or equal to 4, with the proviso that the alcohol $R^2OH$ has a higher boiling point than the alcohol $R^1OH$ or $R^*OH$.

DETAILED DESCRIPTION OF THE INVENTION

The radical $R^1$ is preferably a methyl, butyl, n-octyl or isooctyl radical. Examples of suitable perfluoroalkyl radicals are the trifluoroethyl, the pentafluoropropyl, the nonafluorohexyl and the tridecafluroooctyl radicals.

$R^1$ can also have the meaning of a dialkylaminoalkyl radical. Examples of particularly suitable dialkylaminoalkyl radicals are the dimethylaminoethyl and diethylaminoethyl radicals.

The radical $R^2$ is derived from the alcohol $R^2OH$, which with regard to the transesterification reaction must have a higher boiling point than the alcohol $R^1OH$ or $R^*OH$. The difference in boiling point should be at least 10° C.

As stated, $R^*$ is derived from a chain regulator, known per se, of the type $R^*OC(O)$—$(CH_2)_n$—SH, in which $R^*$ denotes an alkyl or alkaryl radical having 1 to 16 carbon atoms.

a is a number which on average is at least 4. It preferably has a value from 4 to 500. From this, the resulting molecular weight range ($M_n$) for the novel polymers is from about 400 to 100,000.

The following sections indicate preferred meanings for the radicals $R^2$.

Thus, $R^2$ is preferably an alkyl radical having a greater number of carbon atoms than $R^1$, or an alkenyl radical.

The number of carbon atoms can be up to 30. The alkyl radical can if desired be substituted by inert substituents, for example by halogen radicals. $R^2$ can also be an alkenyl radical, preferably the allyl, hexenyl or oleyl radical, or a radical of the formula

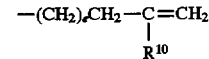

in which $R^{10}$ is hydrogen or a methyl radical and e is a number from 0 to 10.

Furthermore, $R^2$ can preferably be a radical —$R^4$—OH of which $R^4$ is a divalent aliphatic hydrocarbon radical having 2 to 20 carbon atoms. Examples of such radicals —$R^4$—OH are —$(CH_2)_2$—OH, —$(CH_2)_4$—OH and —$(CH_2)_6$—OH.

In a further preferred form, $R^2$ is a radical —$(C_mH_{2m}O$—$)_bR^5$ in which $R^5$ is hydrogen or an alkyl, alkaryl, alkenyl or sulfopropyl radical, m is a number from 2 to 18 and b is at least 1 up to 400. Examples of the radicals $R^5$ are methyl, butyl, stearyl, allyl, hexenyl, nonylphenyl and oleyl radicals.

If m is 2 the polyether radical comprises exclusively oxyethylene units. If the value of m is greater than 2, the polyether radical consists both of oxyethylene units and a proportion of oxyalkylene units each of which contains from 3 to 18 carbon atoms. In this case, n can adopt the value of a fractional number between 2 and 18. The oxyalkylene block preferably consists of oxyethylene units, with it being possible if desired for oxybutylene units to be present in addition to oxypropylene units. Oxyalkylene units having from 4 to 18 carbon atoms are preferred if the transesterification product is to have hydrophobic properties; an example of such a unit is the oxytetramethylene radical.

In a further preferred form, $R^2$ can also be a radical

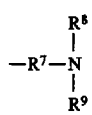

or the radical

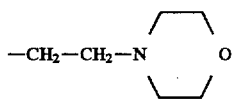

in which $R^7$ is a divalent aliphatic hydrocarbon radical having 2 to 6 carbon atoms in the carbon chain or is the radical $-(C_xH_{2x}O-)_yC_tH_{2t}-$, and the indices have the following values: $x=2$, 3 or 4; $y=1$ to 20; $t=2$, 3 or 4.

$R^8$ and $R^9$ are identical or different and are each alkyl radicals having 1 to 18 carbon atoms.

The nitrogen atom can be in protonated or quaternized form. Quaternization is preferably carried out by reaction with a quaternizing group such as benzyl chloride, benzyl bromide, or methyl chloride, in which case the nitrogen atom becomes substituted with respectively benzyl or methyl.

Examples of such radicals are

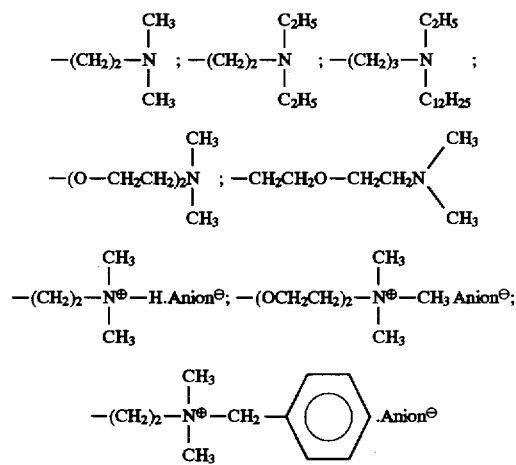

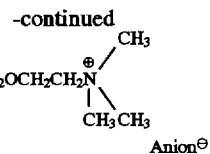

The radical $R^2$ can also adopt the meaning of a radical $-(CH_2)_cC_dF_{2d+1}$ in which c is a number from 2 to 10 and d is a number from 1 to 12. Preferred examples of such radicals are $-(CH_2)_2-C_4F_9$ and $-(CH_2)_2-C_8F_{17}$.

Finally, the radical $R^2$ can have the meaning of the radical $$+CH_2\!\!\to_r\!R^{11}+CH_2-\underset{\underset{R^{13}}{|}}{\overset{\overset{R^{12}}{|}}{C}}\!\to_f\!H$$

in which $R^{11}$ is an oxygen or sulfur radical, $R^{12}$ is hydrogen or a methyl radical, $R^{13}$ is a phenyl radical or a radical $-C(O)OR^{14}$ or $-OC(O)R^{15}$ $R^{14}$ is hydrogen or an alkyl, alkylfluoroalkyl or dialkylaminoalkyl radical in which the nitrogen atom can be in protonated or quaternized form, and $R^{15}$ is an alkyl radical, r is a number from 2 to 6, and f is a number from 2 to 100.

The $R^4$ and $R^5$ radicals preferably contain 1 to 18 carbon atoms; a preferred $R^{14}$ group is t-butyl.

Examples of such radicals are the ω-hydroxypolystyrene radical, the ω-hydroxypoly-n-or -t-butyl methacrylate radical and the ω-hydroxypolyvinyl pivalate radical. From the ω-hydroxypoly-t-butyl methacrylate radical it is possible, by acid-catalyzed elimination of isobutene, to obtain the polymethacrylic acid radical.

Examples of novel polymethacrylic esters are:

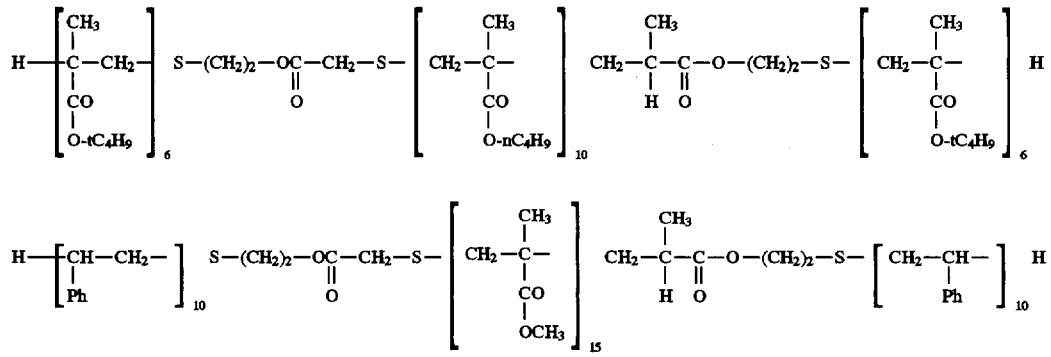

-continued

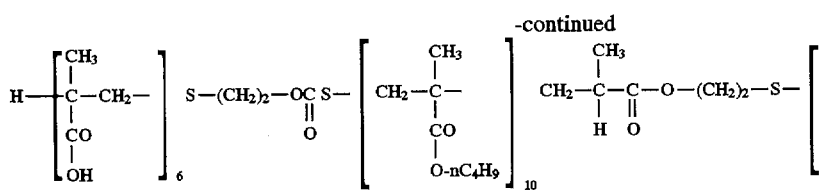

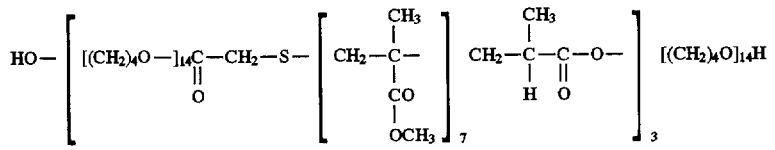

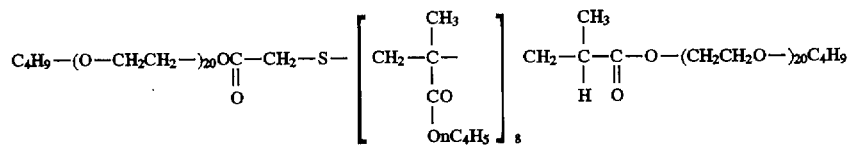

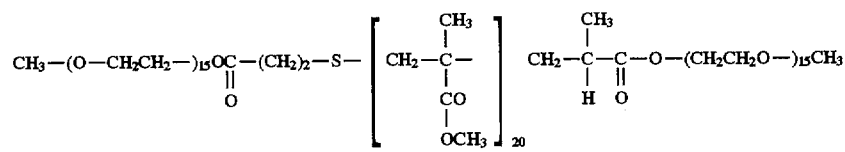

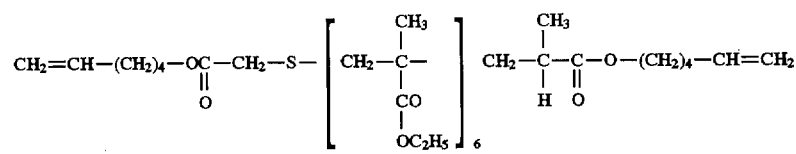

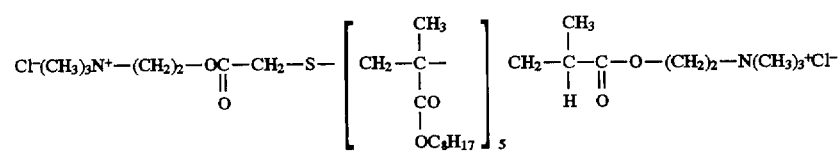

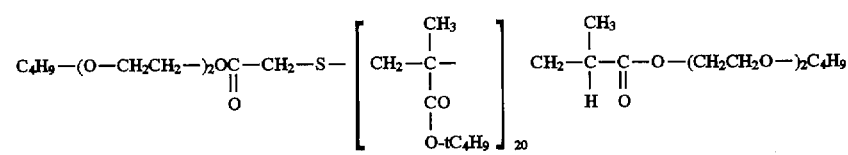

It is clear to the person skilled in the art that the novel polymethacrylic esters of the general formula (I) have properties which may be of great interest in terms of their technical application, for instance as coatings, in that, for example, their compatibility with other media can be altered in a desired manner. This applies to the hydrophobicity, the hydrophilicity and the dirt-repellency properties. By an appropriate choice of the alcohols used for the transesterification it is possible to obtain antistatic properties. Where the alcohols used for the transesterification comprise additional functional groups and groups which are accessible for further reactions, for example a further OH group or —CH=CH₂ group, there is the possibility of reacting the novel products further, to form block polymers of the type ABA or (AB)$_n$, or to form comb polymers. By this means the preparation of new kinds of block polymers is made possible.

The synthesis of alternating block copolymers of the type (AB)$_n$ is carried out by tranesterification with α,ω-dihydroxy-functional polymers, for example polyethylene glycol, polypropylene glycol or polyoxytetramethylene in molar ratios of from 1:1 up to 1:2.

The invention additionally relates to a process for the preparation of the novel polymethacrylic esters, according to the invention, of the formula (I). The novel process is characterized in that polymethacrylic esters of the general formula (II)

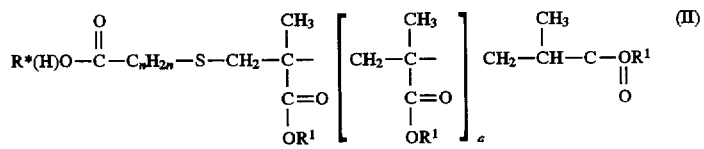

in which the radicals $R^1$ and $R^*$ and the index a are as already defined, and which are obtained by free-radical polymerization in the presence of ester-functional or carboxyl-functional mercaptans, are transesterified with alcohols of the formula $R^2OH$ at temperatures from 100° to 130° C,. in the presence or absence of solvents, with the addition of nonbasic tranesterification catalysts which are known per se, in a molar ratio of polymethacrylic ester: $R^2OH$ of from 1:1 to 1:5, preferably 1:1 to 1:2.

Given these process conditions, it was surprising that transesterification takes place only on both terminal methacrylic ester groups. The methacrylic esters present in the chain undergo transesterification either not at all or only to an extremely minor, negligible extent. However, a condition for this is that no reaction temperatures greater than 150° C. are used.

Preferred tranesterification catalysts are alkyl titanate, alkyl zirconate, dialkyltin acetate halide or dialkyltin dialkyl ester, which are used in quantities of from 0.1 to 2% by weight based on polymethacrylic ester. Examples of particularly suitable catalysts are isopropyl titanate, n-propyl zirconate, dibutyltin acetate chloride, dibutyltin diacetate and dibutyltin dilaurate.

The reaction temperature is 70° to 150° C., preferably 100° to 130° C.

The reaction can be carried out with or without solvent. When a solvent is used, it is suitably toluene, xylene or a petroleum fraction with a boiling range of from 70° to 140° C.

In the examples which follow the preparation of the novel compounds is illustrated in more detail.

EXAMPLE 1A

Preparation of a polymethyl methacrylate by free-radical polymerization in the presence of methyl mercaptoacetate as chain transfer agent (not according to the invention)

A solution of 7.0 g of azodiisobutyronitrile and 247.7 g (2.33 mol) of methyl mercaptoaceate in 483 g of toluene and 2086 g (20.83 mol) of methyl methacrylate (MMA) was metered over the course of 4 h into a reactor filled with 150 g of toluene; the initial solvent charge had a temperature of about 100° C. and was under a nitrogen atmosphere. Subsequently a further 4.7 g of azodiisobutyronitrile dissolved in 47 g of methyl ethyl ketone was added in equal portions over the course of 1 h. Finally, the reaction mixture was heated at a constant temperature of 100° C. for 1 h more. After the end of the reaction, the solvents and the residual monomer were distilled off at 80° C./1 torr to leave a colorless, viscous liquid.

Analysis by gel permeation chromatography (calibration against PMMA standards) gave for the resulting polymer a number average molecular weight $M_n$ (GPC) of 900 and a weight-average molecular weight $M_w$ (GPC) of 1800, with a consequent polydispersity factor (PD) of 2.00. Determination of the molecular weight by vapor pressure osmometry gave an $M_n$ of 1050. the residual monomer content was <0.1%.

EXAMPLES 2A to 6A

Preparation of polymethacrylates with different alkyl groups and different molecular weights by controlled free-radical polymerization in the presence of methyl mercaptoacetate (not according to the invention).

The procedure of Example 1A was repeated with the exception that the molar ratios of the corresponding methacrylate monomer and methyl mercaptoacetate (monomer/regulator) were altered as indicated in Table 1.

In Example 5A, methyl methacrylate (MMA) was replaced by a mixture of methyl methacrylate and n-butyl methacrylate (BMA) in equimolar ratio.

In Example 6A, methyl mercaptoacetate (MAME) was replaced by ethyl mercaptoacetate (MAEE) as chain transfer agent (regulator). In addition to the molecular weights determined by gel permeation chromatography ($M_n$/GPC; calibration against PMMA standards), Table 1 indicates molecular weights determined by vapor pressure osmometry ($M_n$/Osmo.).

TABLE 1

Preparation of polymethacrylates by free-radical polymerization in the presence of mercaptoacetates as chain transfer agents (regulators)

| Example | Monomer | Regulator | Monomer/ regulator (mol/mol) | $M_n$ (GPC) | PD ($M_w/M_n$) | $M_n$ (Osmo.) |
|---|---|---|---|---|---|---|
| 1A | MMA | MAME | 9 | 950 | 2.00 | 1050 |
| 2A | MMA | MAME | 30 | 2950 | 1.88 | 3100 |
| 3A | BMA | MAME | 8 | 1020 | 1.84 | 1000 |
| 4A | CHMA | MAME | 7 | 1150 | 1.71 | 1350 |
| 5A | MMA/BMA | MAME | 8 | 980 | 1.64 | 1100 |
| 6A | MMA | MAEE | 8.8 | 1060 | 1.66 | 1010 |

EXAMPLE 1B

Preparation of an α-methyl-ω-hydroxypolyethylene oxide (not according to the invention)

64 g (2 mol) of methanol and 23 g (0.33 mol) of potassium methylate were placed in a reactor. After careful flushing with pure nitrogen the mixture was heated to 110° C., and 2360 g (about 54 mol) of ethylene oxide was added at a rate such that the internal reaction temperature did not exceed 120° C. and the pressure did not exceed 6 bar. After all of the ethylene oxide had been passed in, the temperature was held at 115° C. until a constant manometer pressure indicated the end of the ongoing reaction. Finally, the unreacted monomers were removed in vacuo at from 80° to 90° C.

The product obtained was neutralized by means of phosphoric acid and the water was removed by distillation, with the potassium phosphate formed being removed by filtration together with a filtering aid. The molecular weight $M_n$ determined from the calculation of the hydroxyl number with an assumed functionality of 1 (OH number) was 1015.

EXAMPLE 2B

Preparation of an α-methyl-ω-hydroxypolyethylene oxide (not according to the invention).

The process of Example 1B was repeated with the exception that the molar ratio of ethylene oxide to methanol was altered from 27:1 (Example 1B) to 80:1. The concentration of catalyst was 30 mol %, based on methanol.

EXAMPLE 3

Preparation of an α-methyl-ω-hydroxyethylene oxide-propylene oxide copolymer (not according to the invention.)

The procedure of Example 1B was repeated with the difference that 48 g (1.5 mol) of methanol and 34 g (0.46 mol) of potassium methylate were employed and that the ethylene oxide was replaced by a mixture of 4196 g (95 mol) of ethylene oxide and 739 g (12.7 mol) of propylene oxide.

The molecular weight $M_n$ determined from the calculation of the hydroxyl number with an assumed functionality of 1 (OH number) was 2940.

TABLE 2

Chemical composition and molecular weights of some ω-OH-functional polyalkylene oxides

| Polyether from Example | % EO | % PO | $M_n$ (OH number) |
|---|---|---|---|
| 1B | 100 | — | 1015 |
| 2B | 100 | — | 2890 |
| 3B | 85 | 15 | 2945 |

EXAMPLE 4B

Preparation of an ω-hydroxypolystyrene (not according to the invention)

100 g of xylene was heated to 120° C. under a nitrogen atmosphere in a ractor fitted with a stirrer. While keeping the temperature at 120° C., a mixture of 1560 g (15 mol) of styrene, 78.1 g (1 mol) of 2-mercaptoethanol, 4.1 g of azodiisobutyronitrile and 310 g of dried xylene was added over the course of 4 h. After the end of the addition, the reaction was continued for about 15 minutes and then 0.16 g of methylhydroquinone was added. Excess styrene, 2-mercaptoethanol and xylene were separated off by distillation in vacuo (60° to 80° C./10 torr). The reactor contents were made up with xylene to give a colorless, viscous solution of the ω-hydroxypolystyrene obtained with a weight concentration of about 62%.

Analysis by gel permeation chromatography gave the resulting polymer a number average molecular weight $M_n$ (GPC) of 870 and a weight-average molecular weight $M_w$ (GPC) of 1380, with a consequent polydispersity factor or 1.59; comparison of the molecular weight obtained from the determination of the hydroxyl number ($M_n$/OH number) of 950 and the molecular weight determined by vapor pressure osmometry ($M_n$/osmometry) gave a hydroxyl functionality of 0.94. The residual monomer content was <0.1%.

EXAMPLE 5B

Preparation of a monohydroxy-functional poly-t-butyl methacrylate by controlled free-radical polymerization (not according to the invention)

A solution of 1.47 g of azodiisobutyronitrile and 78.1 g (about 1 mol) of 2-mercaptoethanol in 150 g of xylene and 1136.8 g (about 8 mol) of tert-butyl methacrylate (TBMA) was added over the course of 4 h to a reactor filled with 150 g of xylene; the initial solvent charge had a temperature of about 120° C. and was under a nitrogen atmosphere. After the end of the reaction, about 400 ppm of hydroquinone monomethyl ether was added first of all and the solution was cooled to about 40° C., and then solvent and the residual monomer were distilled off at 110° C./1 torr, leaving a colorless, viscous liquid.

Analysis by gel permeation chromatography gave the polymer obtained a number average molecular weight $M_n$ (GPC) of 1300 and a weight-average molecular weight $M_w$ (GPC) of 2170, with a consequent polydispersity factor of 1.67; comparison of the molecular weight obtained from the determination of the hydroxyl number ($M_N$/OH number) of 1150 and the molecular weight determined by vapor pressure osmometry ($M_n$/osmometry) gave a hydroxyl functionality of 1.04. The residual monomer content was <0.1%.

EXAMPLE 1C

Preparation of a polyethylene oxide-b-polymethyl methacrylate-b-polyethylene oxide copolymer (according to the invention)

525 g (about 0.5 mol) of the polymethyl methacrylate from Example 1A, 1065 g (about 1.05 mol) of the polyether from Example 1B and 131 g of toluene was heated to 125° C. under nitrogen in a reactor, during which the solvent was distilled off with simultaneous removal of traces of water. At a temperature of about 120° C., 4.77 g of isopropyl titanate was added and, directly thereafter, a vacuum of about 2 torr was established. The methanol which was liberated during the reaction was removed continuously, along with other volatile constituents (toluene, isopropanol), during the reaction and was condensed. After about 7 h the reaction had ended, with the low residual OH number of the reaction mixture (OH number: 1.9) and the quantitative gas-chromatographic analysis of the distillate (1.01 mol of methanol) confirming the quantitative reaction at both terminal ester groups. Analysis by gel permeation chromatography gave the polymer attained a number average molecular weight $M_n$ (GPC) of 3500 and a weight-average molecular weight $M_w$ (GPC) of 4300, with a consequent polydispersity factor of 1.23.

EXAMPLE 2C

Preparation of a polyethylene oxide-b-polymethyl methacrylate-b-polyethylene oxide copolymer by transesterification in the presence of an inert solvent (according to the invention)

The procedure of Example 1C was followed in principle with the exception that the reactor used had a fractionating column attached. In addition, 900 g of toluene was added to the reaction mixture as inert solvent. Then a small portion of the solvent was distilled off under atmospheric pressure until no further traces of water were seen to be present. Then the catalyst was added and the methanol liberated was separated from the toluene by fractionation. After a reaction time of 6 h the overhead temperature was 110° C.; at this point the reaction had ended. Gas-chromatographic analysis of the distillate indicated a conversion of 97%.

The result of the analysis by gel permeation chromatography gave $M_n$ and $M_w$ values identical to those in Example 1C.

EXAMPLE 3C

Preparation of a polyethylene oxide-b-polymethyl methacrylate-b-polyethylene oxide copolymer by transesterification of an α-ethyl-ester-functional polymethylmethacrylate (according to the invention)

The procedure of Example 2C was repeated in principle with the exception that the polymethyl methacrylate from Example 6A was employed, which was obtained by the polymerization of methyl methacrylate in the presence of ethyl mercaptoacetate as chain transfer agent. It was thus possible to monitor the conversions in position α (liberation of ethanol) and position ω (liberation of methanol) as a function of time. Analysis of the distillate at different points in time indicated the following course of the reaction:

| Time/h | Conversion/% (Ethanol) | Conversion/% (Methanol) |
|---|---|---|
| 1 | 97 | 32 |
| 2.5 | 7 | 28 |
| 7 | — | 42 |

Analysis by gel permeation chromatography gave the polymer obtained a number average weight $M_n$ (GPC) of 3350 and a weight-average molecular weight $M_w$ (GPC) of 4200, with a consequent polydispersity factor of 1.25.

Identical results are obtained if the tranesterification is carried out in the absence of solvent.

EXAMPLE 4C to 10C

Preparation of polyalkylene oxide-b-polymethacrylate-b-polyalkylene oxide copolymers (according to the invention).

The procedure of Example 1C or, respectively, 2C was repeated in principle with the difference that, as indicated in Table 3, polymethacrylates of different chemical structure and of different molecular weights were reacted with polyalkylene oxide homopolymers and copolymers with different molecular weights, and with different ω-monohydroxy-functional compounds.

EXAMPLE 11C

Preparation of a polymethyl methacrylate having two terminal stearyl groups (according to the invention)

1050 g (1.0 mol) of the polymethyl methacrylate from Example 1A, 554 g (2.05 mol) of stearyl alcohol and about 250 g of toluene were heated to 115° C. under pure nitrogen in a reactor, during which the solvent was distilled off with simultaneous removal of traces of moisture. Then 5 g of isopropyl titanate was added and, after vigorous mixing, a vacuum of 5 torr was established. The methanol which was liberated was condensed in a cold trap together with any residues of solvent which may have been present.

After about 5 h the formation of methanol, and therefore the reaction, had ended. Analysis of the distillate by gas

TABLE 3

Preparation of polymethacrylate(B)-ABA triblock copolymers

| Example | OH-funct. compd. (A) from Example | Polymethacryate (B) from Example | Conversion/ OH number | Conversion/GC (methanol or butanol) | $M_w$/GPC (PMMA)/PD[1] | $M_n$/Osmom. |
|---|---|---|---|---|---|---|
| 1C | 1B | 1A | 100 | 101 | 3500/1.22 | 2700 |
| 2C | 1B | 1A | 98 | 97 | 3450/1.24 | 2750 |
| 3C | 1B | 6A | 98 | 103 | 3500/1.22 | 2900 |
| 4C | 2B | 1A | 94 | 98 | 9700/1.19 | 6750 |
| 5C | 3B | 1A | 92 | 96 | 9850/1.21 | 6900 |
| 6C | 1B | 2A | 94 | 96 | 5200/1.44 | 5000 |
| 7C | 1B | 4A | 96 | 101 | 3800/1.21 | 3250 |
| 8C | 1B | 5A | 93 | 94 | 3500/1.18 | 3000 |
| 9C | 4B | 1A | 94 | 92 | 3250/1.49 | 2850 |
| 10C | 4B | 3A | 90 | 91 | 3650/1.52 | 2700 |

[1]PD = polydispersity = $M_w/M_n$

EXAMPLE 10C

Preparation of a polymethacrylic acid-b-polymethyl methacrylate-b-polymethacrylic acid copolymer (according to the invention)

525 g (about 0.5 mol) of the polymethyl methacrylate from Example 1A and 1210 g (about 1.05 mol) of the hydroxy-functional poly-t-butyl methacrylate from Example 5B, dissolved in 1150 g of toluene, was heated to 115° C. in a reactor under nitrogen, and first of all about 100 ml of the toluene present was distilled off with simultaneous removal of traces of water. At a temperature of about 110° C., 8.86 g of isopropyl titanate was added. The methanol liberated in the course of the ensuing reaction was removed continuously, along with other volatile constituents (toluene, isopropanol) during the reaction and was condensed. After about 4 h a further 4.34 g of isopropyl titanate was added, methanol was removed and the reaction was completed after a further 3 h. The hydroxyl number of the resulting product was 4.1, corresponding to a conversion of 92% (based on the component employed in deficit). Analysis by gel permeation chromatography gave the polymer obtained a number average molecular weight $M_n$ (GPC) of 3900 and a weight-average molecular weight $M_w$ (GPC) of 5600, with a consequent polydispersity factor of 1.43.

From 250 g of the resulting product in solution in toluene, the solvent was removed by distillation and replaced by 150 g of dioxane. 3.75 g of p-toluenesulfonic acid monohydrate was added to this solution, and the mixture was heated at about 95° to 100° C. The beginning of elimination of isobutene could be recognized from a marked evolution of gas. After a reaction time of about 5 h, the evolution of gas had ended. The acid number of the resulting product in solution was 390, corresponding to a conversion of 95%.

NMR spectroscopy (comparison of the signal intensities of the characteristic t-butyl group) likewise indicated a conversion of 95%.

chromatography gave a conversion of 99%; the conversion calculated from the determination of the hydroxyl number was 95%.

EXAMPLE 12C

Preparation of a poly-n-butyl methacrylate having two terminal diethylaminomethyl groups, and protonated and quaternized derivatives thereof (according to the invention)

1000 g (1.0 mol) of the poly-n-butyl methacrylate from Example 3A, 234 g (2.0 mol) of diethylaminoethanol and about 500 g of xylene were heated to 140° C. under pure nitrogen in a reactor with a reflux condenser attached, during which the solvent was distilled off under atmospheric pressure until no further traces of moisture were visibly present. Then, at about 130° C., 3.7 g of isopropyl titanate was added and stirred in. The butanol which was liberated was separated from unreacted diethylaminoethanol by fractionation and removed. After 4 h the overhead temperature was 135° C. and the reaction had ended. Analysis of the distillate by gas chromatography indicated the conversion to be 96%.

From the determination of the hydroxyl number, a conversion of 95% was found. The resulting solution of the product was yellow-brown in color.

From 250 g (0.2 mol) of the resulting product in solution in xylene, the solvent was removed by distillation and replaced by 250 g of n-propanol. With stirring, a total of 24.0 g of glacial acetic acid (0.4 mol) was added at room temperature over a period of 1 h, and the mixture was stirred for one hour more.

The pH of 10% strength aqueous solution of the protonated material was 7.1.

For quaternization, 250 g of the product, dissolved in propanol, was first of all heated to 120° C. in a pressure reactor. Subsequently, methyl chloride was passed in in a quantity which was such as to give a pressure of 4 bar. This pressure was maintained over a period of 4 h at 120°. Following subsequent cooling to room temperature and removal of the excess methyl chloride, a yellowish product was obtained. The determination of the chloride content and of the amine number indicated a conversion of 93% or, respectively, 97% of theory.

EXAMPLE 13C

Preparation of a polytetrahydrofuran-(A)-b-polymethyl methacrylate-(B) multiblock $(AB)_n$ copolymer (according to the invention)

525 g (about 0.5 mol) of the polymethyl methacrylate from Example 1A, 400 g (about 0.4 mol) of a polytetramethylene ether glycol ($M_n$ about 1000) and 131 g of toluene were heated to 125° C. under nitrogen in a reactor, during which the solvent was distilled off with simultaneous removal of traces of water. At a temperature of about 120° C., 4.77 g of isopropyl titanate was added, and directly thereafter a vacuum of about 2 torr was established. The methanol which was liberated during the reaction was continuously removed, along with other volatile constituents (toluene, isopropanol), during the reaction and was condensed. After about 7 h the reaction had ended and the hydroxyl number of the reaction mixture was now only 3.5. Analysis of the distillate by gas chromatography (0.78 mol of methanol) confirmed the almost quantitative reaction of the polytetramethylene ether glycol employed. Analysis by gel permeation chromatography gave the polymer obtained a number average molecular weight $M_n$ (GPC) of 8200 and a weight-average molecular weight $M_w$ (GPC) of 13,600, with a consequent polydispersity factor of 1.66. The solid end product was yellow in color.

What is claimed is:

1. A polymethacrylic ester having the formula

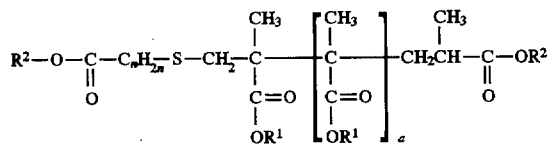

where $R^1$ is alkyl having 1 to 8 carbon atoms, perfluoroalkyl having 1 to 8 carbon atoms or dialkylaminoalkyl in which each alkyl has 1 to 8 carbon atoms; $R^2$ is alkyl having a greater number of carbon atoms than $R^1$, an alkenyl of the formula $$-(CH_2)_eCH_2C=CH_2$$
$$\quad\quad\quad\quad\quad |$$
$$\quad\quad\quad\quad\quad R^{10}$$

where $R^{10}$ is hydrogen or methyl; and e is a number from 0 to 10. $-R^4$ OH where $R^4$ is a divalent hydrocarbon radical having 2 to 20 carbon atoms, $-(C_mH_{2m}O)_b-R^5$ where $R^5$ is hydrogen, alkyl, alkaryl, alkenyl or sulfopropyl; m is a number of 2 to 18; and b is a number greater than 1, $-R^7-N(R^8)(R^9)$ where $R^7$ is a divalent aliphatic hydrocarbon radical having 2 to 4 carbon atoms or $-(C_xH_{2x}O)_y-C_tH_{2t}-$ where x is 2, 3 or 4; y is 1 to 20; and t is 2, 3 or 4; $R^8$ and $R^9$ are the same or different and are alkyl having 1 to 18 carbon atoms with the proviso that the nitrogen atoms is optionally protonated or quaternized,

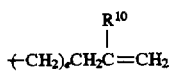

$-(CH_2)_cC_dF_{2d+1}$ where c is a number of 2 to 10; and d is a number of 1 to 12 or

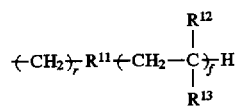

where $R^{11}$ is oxygen or sulfur; $R^{12}$ is hydrogen or methyl; and $R^{13}$ is phenyl or $-C(O)O-R^{14}$ where $R^{14}$ is hydrogen, alkyl, alkylfluoroalkyl or dialkylaminoalkyl in which the nitrogen atom is optionally protonated or quaternized; r is a number of 2 to 6; and f is a number of 2 to 100.

2. A polymethacrylic ester according to claim 1 wherein $R^2$ is

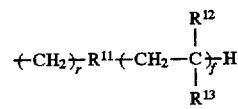

wherein $R^{11}$ is oxygen or sulfur; $R^{12}$ is hydrogen or methyl; $R^{13}$ is phenyl or $-C(O)O-R^{14}$ where $R^{14}$ is hydrogen, alkyl, alkylfluoroalkyl or dialkylaminoalkyl where the nitrogen atom is optionally in protonated or quaternized form; r is a number of 2 to 6; and f is a number of 2 to 100.

3. A polymethacrylic ester according to claim 1 wherein $R^2$ is an alkyl radical having a greater number of carbon atoms than the radical $R^1$.

4. A polymethacrylic ester according to claim 1, wherein $R^2$ is an alkenyl radical of the formula

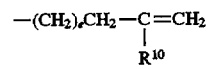

in which $R^{10}$ is hydrogen or a methyl radical and e is a number from 0 to 10.

5. A polymethacrylic ester according to claim 1, wherein the radical $R^2$ is a radical $-R^4-OH$ in which $R^4$ is a divalent aliphatic hydrocarbon radical having 2 to 20 carbon atoms.

6. A polymethacrylic ester according to claim 1, wherein the radical $R^2$ is a radical $-(C_mH_{2m}O-)_bR^5$ in which $R^5$ is hydrogen or an alkyl, alkaryl, alkenyl or sulfopropyl radical, m is a number from 2 to 18 and b is a number greater then 1.

7. A polymethacrylic ester according to claim 1, wherein the radical $R^2$ is a radical

or the radical

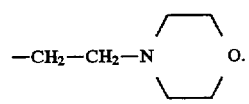

in which $R^7$ is a divalent aliphatic hydrocarbon radical having 2 to 4 carbon atoms in the carbon chain or is the radical $-(C_xH_{2x}O)_y-C_tH_{2t}-$ wherein x is 2, 3 or 4; y is 1 to 20; and t is 2, 3, or 4, $R^8$ and $R^9$ are identical or different and each is an alkyl radical having 1 to 18 carbon atoms, wherein the nitrogen atom is optionally protonated or quaternized.

8. A polymethacrylic ester according to claim 1, wherein the radical $R^2$ is a radical —$(CH_2)_c C_d F_{2d+1}$ in which c is a number from 2 to 10 and d is a number from 1 to 12.

9. A process for the preparation of a polyacrylic ester claim 1 comprising transesterifying a polymethacrylic ester of the general formula

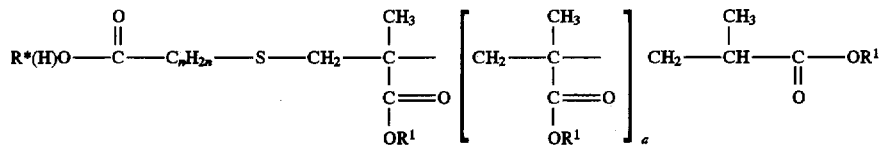

in which n, a and the radicals $R^1$ are as defined above and $R^*$ is derived from a chain regulator, of the formula $R^*OC(O)$—$(CH_2)_n$—SH in which $R^*$ denotes an alkyl or alkaryl radical having 1 to 16 carbon atoms, with an alcohol of the formula $R^2OH$ at a temperature from 70° to 150° C., in the presence or absence of solvent, in the presence of a nonbasic tranesterification catalyst in a molar ratio of polymethacrylic ester to alcohol from 1:1 to 1:5.

10. A process according to claim 9, wherein the tranesterification is carried out in a molar ratio of from 1:1 to 1:2.

11. A process according to claim 9, wherein the transesterification catalyst used is alkyl titanate, alkyl zirconate, dialkyltin acetate halide or dialkyltin dialkyl ester.

12. A process according to claim 10, wherein the transesterification catalyst used is alkyl titanate, alkyl zirconate, dialkyltin acetate halide or dialkyltin dialkyl ester.

* * * * *